(12) United States Patent
Moore

(10) Patent No.: X7272
(45) Date of Patent: Oct. 30, 1832

(54) WASHING MACHINE, & SCOURING, &C.

(76) Inventor: Camm Moore

Cannon Moore of the County of Guilford . N. Carolina.

Letters Patent.

<u>The schedule</u> referred to in these <u>Letters Patent</u> and making part of the same
containing a description in the words of the said Cannon Moore himself of his
improvement in the rolling rubbing Machine for washing Clothes. wool. and
scouring leather, To all to whom these presents shall come, Be it known that I Cannon Moore of the County of Guilford & State of
North Carolina, have invented a new and useful improvement in a machine
for washing Clothes wool & scouring leather with various other domestic
purposes. and that the following is a full and exact description of the con-
struction & operation of the said machine as invented by me, These machines are made with 2 or 3 rollers as the case may require
the small machines for family Washing, are made with 2 heads to each
roller as follows, take inch boards or plank cross and nail them ~~together~~
(where good firm plank 2 inches thick can be had they may be made of one
piece) round them to 13½ inches diameter; make a central mortice 2 inches
square, to receive an axle of heavy wood 2 inches square shouldered & 16
inches the whole length.

Take a strip of paper, measure round one head of the roller, lay the paper
off into 25 steps with the compasses, then put the paper round the heads
of the rollers, and mark through the steps for laying on the slats.

~~Lath should be sawed 2 inches wide 1½ inch thick and dressed down~~ to 1¼
inch face, & 3/4 inch for the inner edge, 16 inches long shouldered at each
end 3/4 inch to nail on the heads where they were laid off or marked,
They must be bored or countersunk then nailed on the heads in a <u>bias</u>
form one roller ~~having~~ bias to the right the other to the left to prevent their
tracking by putting on the slats bias, the ends are higher than the middle
they must be taken off with a jointer to bring them level,
Carefully [illegible] off the [illegible] of the slats with a sharp file smooth and a little rounding, to prevent chafing the clothes. There must be a 1/2 inch hole bored in the centre in each end of the axles to receive an iron gudgeon 4 inches long made in the form of a spike all but one inch, this made round and smooth to receive the coupling rods which are two rods of iron exactly of a length with a hole in each end and long enough to allow the rollers to run entirely free of each other, They must be bored out in the middle to prevent their coming off, or rubbing the heads of the rollers. If handles are used instead of the sweep they are made like plough handles, only less thinner and lighter with 2 rounds to hold them in place, & on the inside of the lower ends a flat piece of iron 6 inches long put on with screws with a hole at the lower ends, to go on the gudgeons over the coupling rods, The rollers now done which are the first things to be made and the wash box, To be made to receive the rollers without rubbing.

The boards or plank should all be good timber (pine) and without sap & when dressed out of the dimensions specified, Where a wooden bottom is intended, the water bed is first to be made, the side plank must be one inch thick and 7 inches wide and long enough to allow the straight parts of the bottom to be 4 feet 8 inches long. the ends of the side plank are slanted out boat fashion to an angle of about 45 degrees the short cut edge down the bottom and ends of good inch plank put across making the water bed or box wide enough, to allow the rollers 1/4 inch play between the sides of the water bed, The bottom must be nailed with 8d. nails in a zig zag form to prevent splitting the plank, Dress off the ends of the bottom even with the side plank, & put on a neat and well fitted moulding on each side, nailing it to the ends of the bottom & to the side plank, then a border plank 3/4 inch thick & 8 inches wide, is to be put on the outside of the water bed with 2 1/2 inches lap, the ends square with a similar plank. 4 iron clamps at each end one at each corner, upon the border and also on the water bed, Then put a short moulding over the clamps.

The light frame to support the counter bottom is made of two pieces of good strong wood 1 inch thick 1 1/2 inch wide & as long as the inside of the principal bottom, There must be a round notch in the middle of the upper edge 1 inch wide & 3/4 inch deep after it is lined with sheet iron, from the from the notch they must be slanted to each end leaving the ends not more
than 7/8 inch thick 6 inches each side of the notch in both must be a small
mortice to allow 2 pieces of elastic wood with a tenon at each end long
enough to go thro' to the sides and leave the long notched pieces 2 inches
from the sides and the tenons fastened in with 4d nails The counter bottom is made of lath the length of the principal bottom 3/4
inch thick and 1½ wide one side bevelled from the centre on both sides to an
edge with the upper side, they are to be nailed in the middle with 4d nails
(the bevelled side down ¾ of an inch apart to a piece of strong wood, as long
as the box is wide 1 inch thick 1½ wide put flat side down rounded near
the ends and covered with iron to turn in the notches of the bed pieces.

At each end on the upper side, must be a piece of thin firm wood;
drive the nails thro' the laths and clinch them in these pieces to prevent
the heads from injuring the clothes, lay the frame in the wash box, and
see that all fits well and that the counter bottom plays freely up and down
without either end or side touching the box on the under side, at one end
must be a piece of plank, nailed on & a hole bored thro' both to draw off the
water, —— Where metal bottoms are required the bottom is the first
thing to be made if the sheet be 6 feet long by 1 feet 10 inches wide, draw
two straight lines 17 inches apart from one end to the other, allowing 2½
inches each side to turn up, Then at one end cut along each of the
lines 3½ inches exactly of a length, now measure from the stop of the cut
along the lines 4 feet 8 inches and cut the lines. cut, from that measure,
draw a line to an angle of 45 degrees from the stop of each cut, to the
edge towards each corner, The sides and ends must be punched half an
inch from the edge in a zigzag form that the rivets may not split the
plank, in riveting — The sides from the cut. to the regular lines, must be
turned up square, that the ends of the bottom when raised may come in
between the sides, now turn up the sides, square with the lines, where
the ends of the bottom are to be riveted to the sides, the bottom parts can
be punched before they are turned up & the ends of the sides punched thro'
the holes, These metal bottoms are used as boilers & set in an arch or
furnace; the end that stands over the mouth of the furnace, has the metal go to the top & that part of the side that laps round the end must be riveted to
the end to strengthen the end of the bottom. There must be a square hole
made at the back end of the bottom, 2 inches long by 1 inch wide to draw
off the water. Then there must be a plate of metal made to fit the bottom
at the turn, over the hole, and punched & the hole marked & cut out to
fit that in the bottom. Then a socket about 2 inches long fitted and
brazed to this plate and riveted on.

Rags are the best stoppers. the water bed is next the plank must be
large inch thick & the width enough to make 8 inches from the bottom to
the top of the water bed. There must be a shallow rabbit taken out of
this plank, where the metal is put on & should be flagged between.

Now the border plank is to be put on. this plank is ⅞ inch thick
and 8 inches wide & lapped on the water bed 2½ inches.

This plank is square ended. now when the height of the box is known, there
must be a piece of metal riveted on the top of the furnace end, and long
enough to turn at each side to be riveted to the border plank, for a support
to the end, instead of a clamp, the other end must have ~~a~~ clamps on it.

Where the cost of the metal bottom is thought too great a substitute can
be made of almost equal value with half the cost, by having a box made as for
a wooden bottom. put on a piece or two of plank at each end of the bottom, then
have a sheet of iron 3 feet square punched on every edge ready for nailing; lay
the sheet in the middle of the box & mark it on each side to fit the water
bed, then turn up the sides and fit it to its place, & nail it to the water bed
on the out side; then put on the plank from the sides to the metal; the
piece that comes on the metal must have a shallow rabbet the thickness of
the metal, then flag between them turn the box up and nail the metal to
the wood inside. [illegible] must stand [illegible] the furnace and answer [illegible]
for boilers. Let it be observed that if iron, a sheet 6 feet long & 2 feet wide
not weighing 30 lb is too thin for bottoms to boilers.

All iron bottoms when done using must be dried & have every part rubbed
over with a greasy cloth, and the wood taken out, & put by safely.
The remainder of the machine, not described with the metal bottoms is the
same as specified with the wooden bottoms. [illegible]

make according to what they are intended to perform, there is wood iron & copper
bottoms smaller or larger from [illegible] feet 8 inches in the bottom with 2 rollers, to 9
feet or more, with 3 rollers 2 feet in diameter or more if required.
For washing leather, wool, & other purposes, these large machines are worked altogether
by the power of a sweep - which is the invented plan for all these washing machines
to operate upon, handles are only put to them to render them portable & for
immediate trial of their performance,
Instead of handles, there are hounds to couple the rollers to the sword of the
sweep, these hounds should be made of rough spongy wood for small
machines [illegible] feet long 3 inches wide and ½ inch thick, set in suitable
shape by heat with a similar iron on the lower ends, as is described for the
handles a hole thro the upper ends, between which the sword comes, & a
pin of wood goes thro the sword and hounds & fastened,
There must be a round put thro the hounds before the rollers to keep them
in proper place, The sweep for working the machine is simple & easy made.
Have two sills 9 or 10 feet long, for a wooden bottom, one to be put on each
side of the wash box, cross sills let in 5 or 6 feet long, near one end of each
long sill set in a post 6 feet long 6 inches down from the top, made an open
mortise an inch or more wide in each post, to receive a gudgeon from
each end of the beam which must be as long as the posts are apart at top,
this beam may be 6 inches square, with a mortise near one end, 6 inches
long 1½ inches wide to receive a tenon on a piece of wood as heavy as one
of the rollers. this weight must be tapering 2 feet long the longest end, cut
2 feet from the other end of the beam, make a mortise 1½ inch square, at
right angle with the first mortise, the square mortise is to hold a
sword [illegible] feet long 3 inches wide & 1½ inch thick of rough strong wood
with several holes bored thro it, near the lower end, to shorten or
lengthen the run of the rollers,
Between the sword & the end of the beam make another mortise of the
same size as the one for the sword, this mortise is to be in the same square
with the first, to hold a staff 6 or 7 feet long to work the sweep by.
Now set the wash box across some plank or sills near the long end of the
sills, bring forward the hounds and fasten them to the sword having a rope fastened to the end of the staff, pull the rope which will extend the rollers
& see whether the box stands at a right distance from the sword, if the
rollers strike the further end, of the box move it back, if it strikes both
ends move the rounds, higher up the sword, & fix something at a proper
distance for the staff to counter upon, Where the sweep is fixed to boilers the sides are not wanting to go by
the sides of the wash box & therefore may be shorter.

Observe that the ballance weight to the beam returns the rollers freely
over the clothes if not add more weight to the end of it. The principle
that induced the invention was to lighten labor & lessen friction.

Method of using the boiler. Put the water in the boiler
make it as warm as for common washing by hand, then put or
spread in a reasonable quantity of clothes, after soaping them sufficiently
in the needful parts; now start the rollers over them, but mind to
keep the fire down, so as not to boil the water till the clothes are
thought fit for boiling, then raise or increase the fire, & if preferred
put in lye, and boil, keeping the rollers going & when they are sufficient
-ly boiled they will be clean & fit for rinsing. Take them out & put
in more, temper the water to a right heat, lower the fire, & proceed
as before until the strength of the suds is exhausted; fill the box or
put in a sufficient quantity of cold water and proceed to rinse
in the same manner, they were washed, The wooden bottoms require the first process, then taken out &
boiled in the ordinary way, in a pot or kettle & then put back un-
der the rollers for rinsing.

By this method may be washed from the finest lace or tenderest
muslin, without friction or injury, to the coarsest cloth, sacks, or car-
pets.

Witness
L. Stephens. [illegible]
W. W. Tyler.

Camm Moore

2535 [illegible]